United States Patent [19]
Makino et al.

[11] Patent Number: 5,400,341
[45] Date of Patent: Mar. 21, 1995

[54] CONTROL DEVICE FOR CONTROLLING A CENTRAL PROCESSING UNIT ON INSTANTANEOUS VOLTAGE DROP

[75] Inventors: Masayuki Makino, Tokyo; Hidetoshi Takenaka, Saitama, both of Japan

[73] Assignee: NEC Corporation, Tokyo, Japan

[21] Appl. No.: 40,433

[22] Filed: Apr. 1, 1993

[30] Foreign Application Priority Data

Apr. 1, 1992 [JP] Japan .................. 4-080076

[51] Int. Cl.⁶ ............................. G06F 11/00
[52] U.S. Cl. ......................... 371/12; 371/66
[58] Field of Search ............ 371/12, 14, 62, 66, 371/16.3; 364/184, 185, 483; 307/272.3

[56] References Cited

U.S. PATENT DOCUMENTS

| | | | |
|---|---|---|---|
| 4,234,920 | 11/1980 | Van Ness et al. | 364/200 |
| 4,370,723 | 1/1983 | Huffman et al. | 364/483 |
| 4,761,824 | 8/1988 | Saito | 455/127 |
| 4,908,523 | 3/1990 | Snowden et al. | 307/43 |

FOREIGN PATENT DOCUMENTS

WO9006555 6/1990 WIPO .

OTHER PUBLICATIONS

"Betriebsspannungskontrolle für Einchip-Mikrorechner", Radio Fernsehen Elektronik, vol. 38, No. 8, 1989, Berlin DD pp. 498–499.

Primary Examiner—Steven L. Stephen
Assistant Examiner—Y. Jessica Han
Attorney, Agent, or Firm—Sughrue, Mion, Zinn, Macpeak & Seas

[57] ABSTRACT

In a control device for controlling a CPU 11 in accordance with an input voltage which is applied to the CPU and which results from a power source voltage, a first detecting circuit 16 produces a first detection signal when the power source voltage is lower than a first voltage. Responsive to the first detection signal, a switching circuit 21 stops supply of the input voltage to the CPU and the CPU assumes to a waiting state. A condenser 15 discharges an electric voltage in order to compensate a drop of the input voltage. When the input voltage is lower than a second voltage which is lower than the first voltage, a second detecting circuit 17 produces a second detection signal to make the CPU become a reset or an initial state.

5 Claims, 4 Drawing Sheets

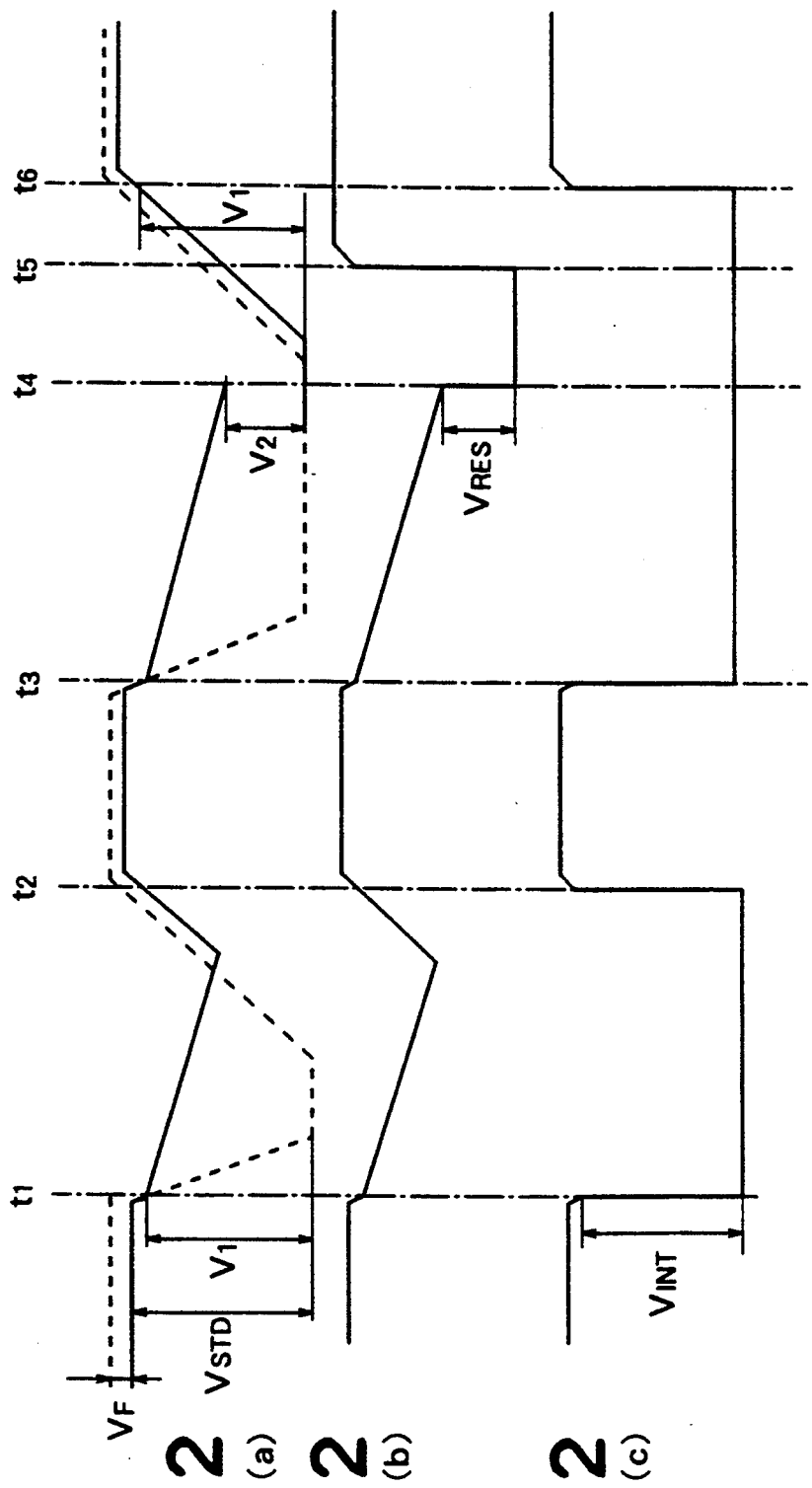

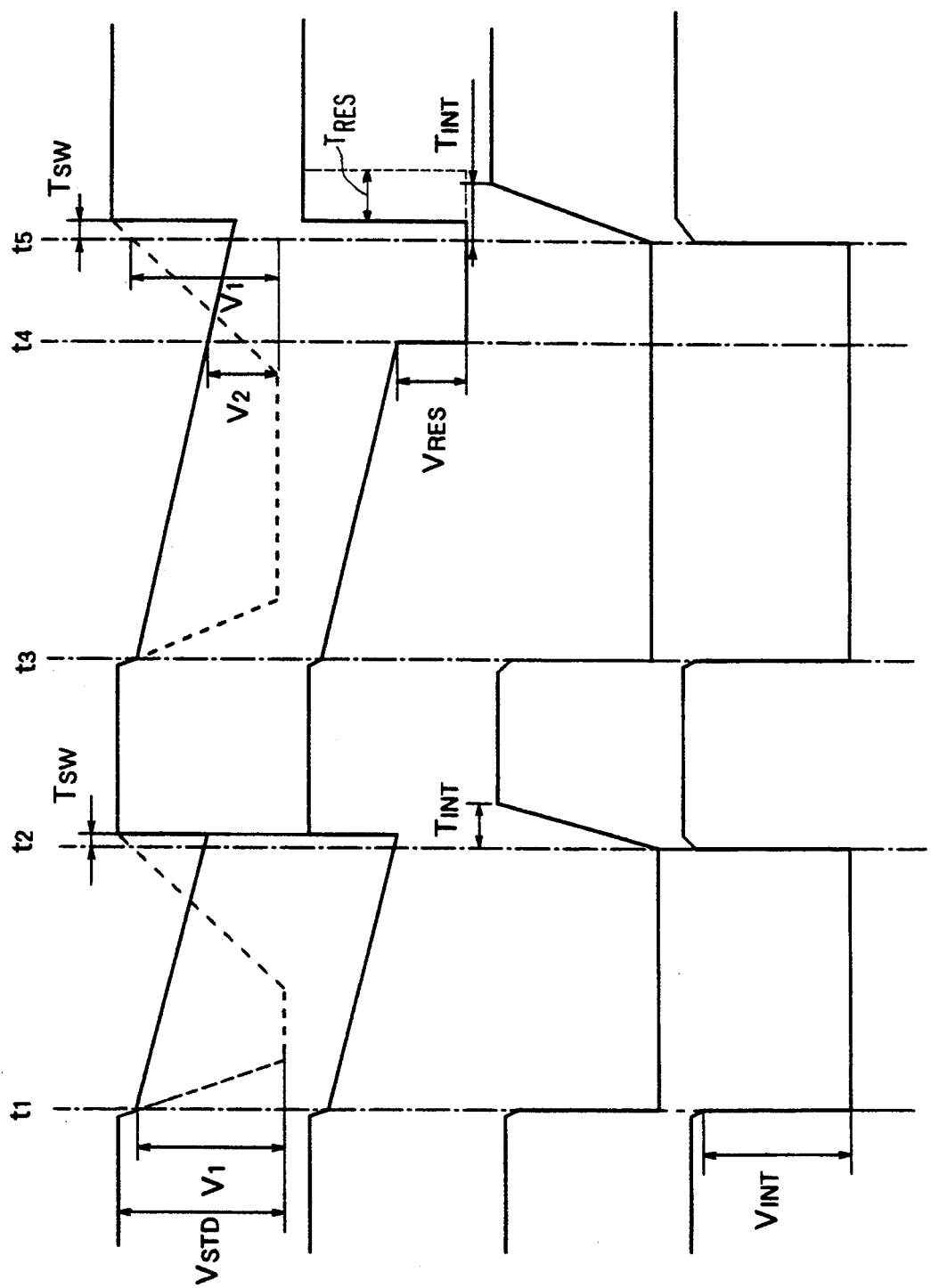

CONTROL DEVICE FOR CONTROLLING A CENTRAL PROCESSING UNIT ON INSTANTANEOUS VOLTAGE DROP

BACKGROUND OF THE INVENTION

This invention relates to a control device for controlling a central processing unit on instantaneous voltage drop.

A central processing unit may suffer from a voltage drop which occurs in a power source voltage during its operation. In a normal state, the central processing unit is not controlled by the control device and maintains its operation when the power source voltage has a normal level. On the other hand, the central processing unit may be controlled by a control device only during the instantaneous voltage drop. More particularly, when the power source voltage is reduced or dropped to a first level which is lower than the normal level, the central processing unit is controlled by the control device to be turned to a waiting state. When the power source voltage is further reduced to a second level which is lower than the first level, the central processing unit is controlled by the control device to be turned to a reset state or an initial state.

A conventional control device of the type described comprises an input voltage applying section which is connected to a power source providing a power source voltage and which is connected to the central processing unit through a back-up condenser. The input voltage applying section supplies the central processing unit with an input voltage which results from the power source voltage. The conventional control device further comprises first and second detecting sections which will be later described.

The central processing unit has an interrupt terminal and a reset terminal which are given a waiting signal and a reset signal from the first and the second detecting sections, respectively. The central processing unit is turned to the waiting state on receiving the waiting signal through the interrupt terminal while the central processing unit is turned to the reset state on receiving the reset signal through the reset terminal.

The first detecting section detects whether or not a level of the input voltage is lower than the first level. When the level of the input voltage is lower than the first level, the first detecting section supplies the interrupt signal to the interrupt terminal of the central processing unit to render the central processing unit into the waiting state. The second detecting section detects whether or not a level of the input voltage is lower than the second level. When the level of the input voltage is lower than the second level, the second detecting section supplies the reset signal to the reset terminal of the central processing unit to render the central processing unit into the reset state.

However, the conventional control device controls the central processing unit so that the central processing unit is put into the waiting state even when a slight voltage drop occurs in the power source voltage. As a result, the central processing unit is very often turned to the waiting state.

In addition, it is necessary with the above-mentioned structure to require a back-up condenser of large capacity so as to compensate the instantaneous voltage drop of the input voltage.

SUMMARY OF THE INVENTION

An object of the present invention is to provide a control device which is favorably capable of controlling a central processing unit without frequent occurrence of a waiting state in the central processing unit.

Another object of this invention is to provide a control device of the type described, which dispenses with the requirement for a large capacity of a back-up condenser so as to compensate the instantaneous voltage drop of the input voltage.

Other objects of this invention will become clear as the description proceeds.

On describing the gist of this invention, it is possible to understand that a control device is connected to a power source having a power source voltage and is for controlling a central processing unit in accordance with an input voltage which is applied to the central processing unit and which results from the power source voltage. The central processing unit has a first terminal for receiving a first signal to make the central processing unit become a first state and a second terminal for receiving a second signal to make the central processing unit become a second state.

According to this invention, the control device comprises (1) input voltage applying means connected to the power source for applying the input voltage to the central processing unit, (2) first detecting means for detecting whether or not the power source voltage is lower than a first voltage to supply the first signal to the first terminal when the power source voltage is lower than the first voltage, and (3) second detecting means for detecting whether or not the input voltage is lower than a second voltage which is lower than the first voltage, the second detecting means supplying the second signal to the second terminal when the input voltage is lower than the second voltage.

BRIEF DESCRIPTION OF THE DRAWINGS

FIG. 2 is a time chart for describing operation on instantaneous voltage drop in FIG. 1;

FIG. 5 is a time chart for describing operation on instantaneous voltage drop in FIG. 1.

DESCRIPTION OF THE PREFERRED EMBODIMENT

Figure 1:
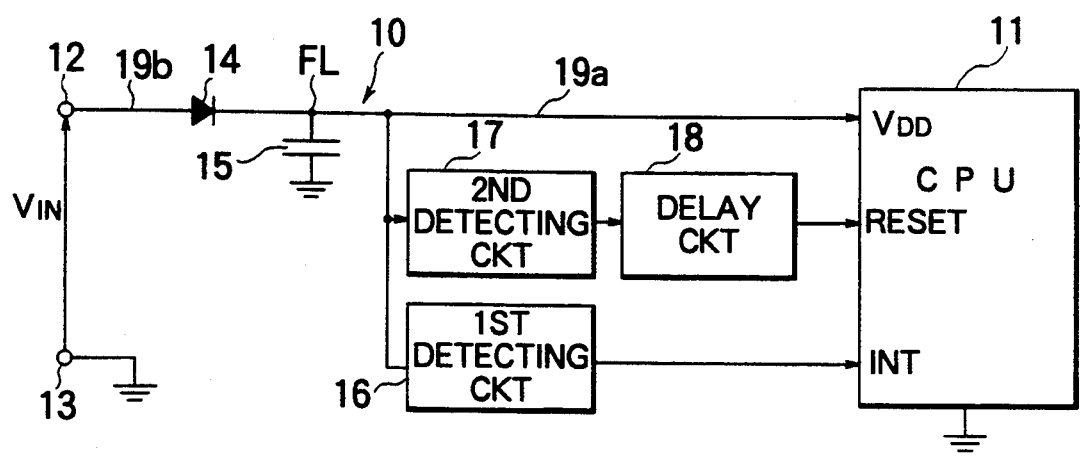
FIG. 1 is a block diagram for describing a conventional control device.

Referring to FIG. 1, description will first be made as regards a conventional control device 10 for better understanding of this invention. The control device 10 is for controlling a central processing unit (CPU) 11 in accordance with an input voltage which is applied to the CPU 11. The control device 10 comprises first and second input terminals 12 and 13 which are connected to a power source (not shown) having a power source voltage Vin. More particularly, the power source voltage Vin appears between the first input terminal 12 and the second input terminal 13 since the second input terminal 13 is grounded.

The control device 10 further comprises a diode 14, a condenser 15, a first detecting circuit 16, a second detecting circuit 17, and a delay circuit 18. The CPU 11 has a CPU input terminal labelled "VDD" which is connected to the cathode of the diode 14 through a first voltage applying line 19a. The anode of the diode 14 is connected to the first input terminal 12 through a second voltage applying line 19b. The condenser 15 is connected to the first voltage applying line 19a at a connecting point labelled "FL" and is connected to the ground.

The first and the second detecting circuits 16 and 17 are connected to the first voltage applying line 19a between the connecting point FL and the CPU input terminal VDD. The CPU 11 further has a reset terminal labelled "RESET" and an interrupt terminal labelled "INT". The first detecting circuit 16 is connected to the interrupt terminal INT of the CPU 11. The second detecting circuit 17 is connected to the reset terminal RESET of the CPU 11 through the delay circuit 18.

The CPU 11 is operable when an operation voltage VSTD is applied as the input voltage to the CPU input terminal VDD. Generally, the operation voltage VSTD must be not less than a predetermined voltage V1 in order to operate the CPU 11. The CPU 11 may have a plurality of random access memories. In order to maintain the contents in the random access memories, it is necessary to apply the CPU input terminal VDD to a prescribed voltage V2 which is lower than the predetermined voltage V1.

It will be assumed that the diode 14 has a forward voltage VF. Inasmuch as it is necessary to apply the CPU input terminal VDD to the operation voltage VSTD in order to operate the CPU 11, the forward voltage VF added to the operation voltage VSTD makes the power source voltage Vin.

Referring to FIG. 2 in addition to FIG. 1, the operation voltage VSTD is supplied as the input voltage to the CPU input terminal VDD when the power source voltage Vin is supplied to the first terminal 12 of the control device as shown along a first row labelled (a) in FIG. 2. In FIG. 2(a), an interrupted line represents the power source voltage Vin and a solid line represents the operation voltage VSTD. Supplied with the operation voltage VSTD, the CPU 11 starts to operate.

The first detecting circuit 16 has a first threshold level VINT which may be equal to a level of the predetermined voltage V1. The second detecting circuit 17 has a second threshold level VRES which may be equal to a level of the prescribed voltage V2. When a level of the operation voltage VSTD is not greater than the first threshold level VINT, the first detecting circuit 16 produces a low level signal which is used as a waiting signal which will later be described. When a level of the operation voltage VSTD is not greater than the second threshold level VRES, the second detecting circuit 17 produces a low level signal which is used as a reset signal which will later be described. In the illustrated example, the second detecting circuit 17 comprises a field effect transistor which has an open drain structure.

It will be assumed that the instantaneous voltage drop occurs in the power source voltage Vin during operation of the CPU 11. At a first time instant t1 in FIG. 2, it will be assumed that the operation voltage VSTD drops to the predetermined voltage V1. At the first time instant t1, the condenser 15 starts to discharge an electric charge which was previously charged by the power source voltage Vin in order to compensate the instantaneous voltage drop. As a result, the operation voltage VSTD is higher than the power source voltage Vin as shown along the first row (a) in FIG. 2. Since the second detecting circuit 17 has the open drain structure, the output of the second detecting circuit 17 follows a variation of the operation voltage VSTD until the operation voltage VSTD drops to the prescribed voltage V2 as shown along a second row labelled (b) in FIG. 2.

At the first time instant t1, the first detecting circuit 16 makes its output change from a high level to a low level as shown along a third row labelled (c) in FIG. 2. Namely, the first detecting circuit 16 produces the low level signal as a first detection signal. The first detection signal is supplied as the waiting signal from the first detecting circuit 16 to the interrupt terminal INT of the CPU 11. Responsive to the waiting signal, the CPU 11 is turned from an operating state to a waiting state.

Before the operation voltage VSTD drops to the prescribed voltage V2, it will be assumed that the power source voltage Vin changes from a drop to a rise. As the power source voltage rises, the operation voltage VSTD rises. When the operation voltage VSTD rises to the predetermine voltage V1 at a second time instant t2 in FIG. 2, the first detecting circuit 16 makes its output become from the low level to the high level as shown along the third row (c) in FIG. 2. Namely, the first detecting circuit 16 stops transmission of the waiting signal to the interrupt terminal INT of the CPU 11. As a result, the CPU 11 is turned from the waiting state to the operating state.

When the instantaneous voltage drop occurs again in the power source voltage Vin at a third time instant t3 in FIG. 2, the first detecting circuit 16 supplies the waiting signal to the interrupt terminal INT of the CPU 11 to make the CPU 11 change from the operating state to the waiting state as described above. When the instantaneous voltage drop continues a long time, the operation voltage VSTD becomes to the prescribed voltage V2 as the condenser 15 discharges to compensate the instantaneous voltage drop.

When the operation voltage VSTD drops to the prescribed voltage V2 at a fourth time instant t4 in FIG. 2, the second detecting signal supplies a low level signal as a second detection signal to the delay circuit 18. The delay circuit 18 has a delay time TRES and delays the second detection signal during the delay time TRES to supply a delayed signal as a reset signal to the reset terminal RESET of the CPU 11. Responsive to the reset signal, the CPU 11 is turned from the waiting state to a reset or an initial state.

When the power source voltage Vin transfers from a drop to a rise and the operation voltage VSTD rises to the prescribed voltage V2 at a fifth time instant t5 in FIG. 2, the second detecting circuit 17 makes its output follow the operation voltage VSTD. Namely, the second detecting circuit 17 stops supply of the second detection signal to the delay circuit 18. As a result, the delay circuit stops supply of the reset signal to the reset terminal RESET of the CPU 11 after the delay time TRES lapses. When the operation voltage VSTD rises to the predetermined voltage V1 at a sixth time instant t6 in FIG. 2, the first detecting circuit 16 stops supply of the waiting signal to the interrupt terminal INT of the CPU 11. As a result, the CPU 11 can carry out operation.

As described above, the control device 10 comprises the diode 14 inter-connecting between the first applying line 19a and the second applying line 19b. Therefore, the power source voltage Vin must be higher than the operation voltage VSTD by as much as the forward voltage VF of the diode 14. In addition, a voltage difference between the operation voltage VSTD and the predetermined voltage V1 is very little. Accordingly, the CPU 11 is put into the waiting state even when a slight voltage drop occurs in the power source voltage Vin. Namely, the CPU 11 is very often turned to the waiting state. Furthermore, it is necessary to require a large capacity of the condenser 15 so as to maintain the operation voltage VSTD to a voltage higher than the prescribed voltage V2 after the CPU 11 is put into the waiting state.

Figure 3:
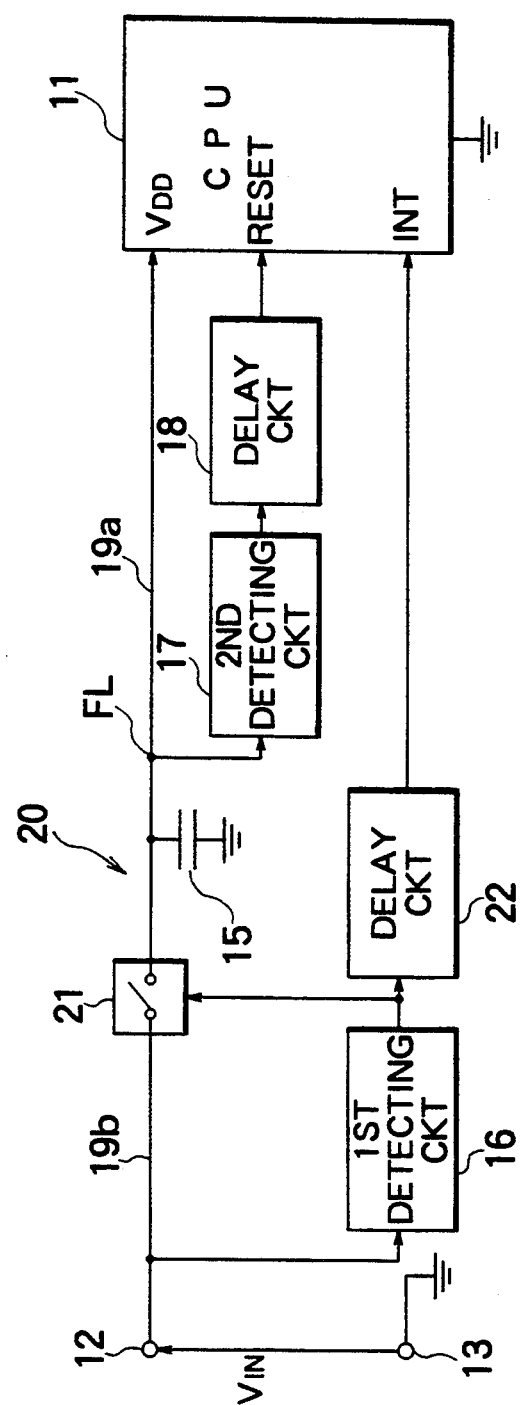
FIG. 3 is a block diagram for describing a control device according to a preferred embodiment of this invention.

Referring to FIG. 3, description will proceed to a control device according to a preferred embodiment of this invention. The illustrated control device is different from the control device 10 illustrated in FIG. 1 and therefore designated afresh by a reference numeral 20. The control device 20 comprises similar parts which are designated by like reference numerals and operable with likewise named signal.

The control device 20 comprises a switching circuit 21 which is for use in connecting the first voltage applying line 19a to the second voltage applying line 19b. In FIG. 3, the first detecting circuit 16 is connected to the second voltage applying line 19b and detects whether or not the power source voltage Vin is lower than the predetermined voltage V1. When the power source voltage Vin is lower than the predetermined voltage V1, the first detecting circuit 16 makes its output drop from a high level to a low level. Namely, the first detecting circuit 16 supplies the first detection signal to the switching circuit 21 and a delay circuit 22 when the power source voltage Vin is lower than the predetermined voltage V1.

Figure 4:
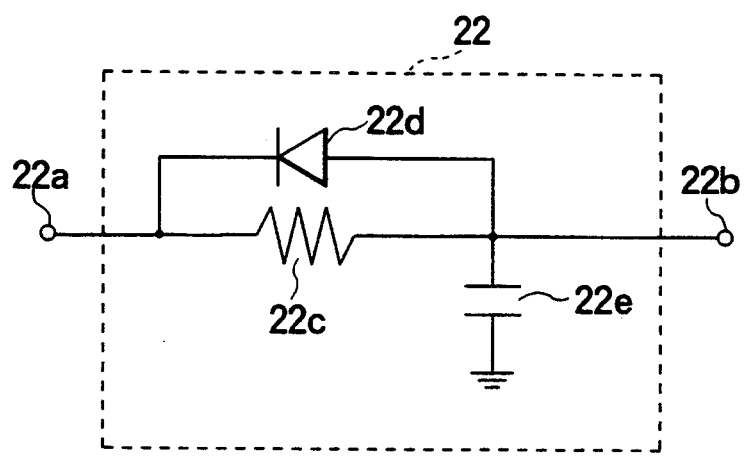
FIG. 4 is a circuit diagram of a delay circuit illustrated in FIG. 3.

Referring to FIG. 4, the delay circuit 22 comprises delay input and output terminals 22a and 22b. The delay circuit 22 further comprises a resistor 22c, a diode 22d, and a condenser 22e. The resistor 22c is connected to the input and the output terminals 22a and 22b. The diode 22d is connected to the resistor 22c in parallel. The condenser 22e is connected to the output terminal 22b and the ground.

Referring to FIG. 5 together with FIGS. 3 and 4, the operation voltage VSTD is supplied as the input voltage to the CPU input terminal VDD when the power source voltage Vin is supplied to the first terminal 12 of the control device as shown along a first row labelled (a) in FIG. 5. In FIG. 5(a), an interrupted line represents the power source voltage Vin and a solid line represents the operation voltage VSTD. Supplied with the operation voltage VSTD, the CPU 11 starts to operate.

It will be assumed that the instantaneous voltage drop occurs in the power source voltage Vin during operation of the CPU 11. At a first time instant t1 in FIG. 5, it will be assumed that the power source voltage Vin drops to the predetermined voltage V1. At the first time instant t1 in FIG. 5, the condenser 15 starts to discharge an electric charge which was previously charged by the power source voltage Vin in order to compensate the instantaneous voltage drop. As a result, the operation voltage VSTD is higher than the power source voltage Vin as shown along the first row (a) in FIG. 5. Since the second detecting circuit 17 has the open drain structure, the output of the second detecting circuit 17 follows a variation of the operation voltage VSTD until the operation voltage VSTD becomes to the prescribed voltage V2 as shown along a second row labelled (b) in FIG. 5.

At the first time instant t1 in FIG. 5, the first detecting circuit 16 makes its output change from a high level to a low level as shown along a fourth row labelled (d) in FIG. 5. Namely, the first detecting circuit 16 produces the low level signal to supply the low level signal as the first detection signal to the switching circuit 21 and the delay circuit 22.

As described in conjunction with FIG. 4, the anode of the diode 22d is connected to the output terminal 22b and the cathode of the diode 22d is connected to the input terminal 22a. Therefore, the output of the delay circuit 22 becomes to a low level the moment the output of the first detecting circuit 16 becomes to the low level. Namely, the delay circuit 22 supplies a low level signal as the waiting signal to the interrupt terminal INT of the CPU 11 the moment the delay circuit 22 receives the first detection signal. Responsive to the waiting signal, the CPU 11 is turned from the operating state to the waiting state.

The first detection signal is further supplied to the switching circuit 21. Responsive to the first detection signal, the switching circuit 21 disconnects the first voltage applying line 19a from the second voltage applying line 19b. Namely, the switching circuit 21 is opened.

Before the operation voltage VSTD drops to the prescribed voltage V2, it will be assumed that the power source voltage Vin transfers from a drop to a rise. As the power source voltage rises, the operation voltage VSTD rises. When the operation voltage VSTD becomes to the predetermined voltage V1 at a second time instant t2 in FIG. 5, the first detecting circuit 16 makes its output become from the low level to the high level as shown along the fourth row (d) in FIG. 5. Namely, the first detecting circuit 16 stops supply of the first detection signal to the switching circuit 21 and the delay circuit 22.

When supply of the first detection signal is stopped, the switching circuit 21 is closed after a switching delay time TSW lapses.

Since the anode of the diode 22d is connected to the output terminal 22b and the cathode of the diode 22d is connected to the input terminal 22a as described in conjunction with FIG. 4, the output of the delay circuit 22 becomes to the high level after a predetermined delay time TINT lapses as shown along a third row labelled (c) in FIG. 5. The predetermined delay time TINT is determined by a resistance of the resistor 22c and a capacity of the condenser 22e. The predetermined delay time may be shorter than the delay time TRES (not shown). Therefore, the delay circuit 22 stops supply of the waiting signal to the interrupt terminal INT of the CPU 11 after the predetermined delay time TINT lapses. The CPU 11 is turned from the waiting state to the operating state.

When the instantaneous voltage drop again occurs in the power source voltage Vin at a third time instant t3 in FIG. 5, the first detecting circuit 16 supplies the first detection signal to the switching circuit 21 and the delay circuit 22. As described above, the switching circuit 21 is opened in response to the first detection signal. The delay circuit 22 supplies the waiting signal to the interrupt terminal INT of the CPU 11 the moment the delay circuit 22 receives the first detection signal.

Responsive to the waiting signal, the CPU 11 changes from the operating state to the waiting state as described above. When the instantaneous voltage drop continues a long time, the operation voltage VSTD drops to the prescribed voltage V2 even though the condenser 15 is depleted in compensating the instantaneous voltage drop.

When the operation voltage VSTD drops to the prescribed voltage V2 at a fourth time instant t4 in FIG. 5, the second detecting circuit 17 supplies a low level signal as the second detection signal to the delay circuit 18. The delay circuit 18 delays the second detection signal .during the delay time TRES to supply a delayed signal as the reset signal to the reset terminal RESET of the CPU 11. Responsive to the reset signal, the CPU 11 is turned from the waiting state to the reset state.

When the power source voltage Vin transfers from a drop to a rise and the power source voltage Vin rises to the predetermined voltage V1 at a fifth time instant t5 in FIG. 5, the first detecting circuit 16 stops supply of the first detection signal to the switching circuit 21 and the delay circuit 22. The switching circuit is closed after the switching delay time TSW lapses. As a result, the operation voltage VSTD rises to the power source voltage Vin.

Therefore, the second detecting circuit 17 makes its output follow the operation voltage VSTD. Namely, the second detecting circuit 17 stops supply of the second detection signal to the delay circuit 18. The delay circuit 18 stops supply of the reset signal to the reset terminal RESET of the CPU 11 after the delay time TRES lapses.

On the other hand, the delay circuit 22 stops supply of the waiting signal to the interrupt terminal INT of the CPU 11 after the predetermined delay time TINT.

In the illustrated example, the predetermined delay time TINT is shorter than the delay time TRES of the delay circuit 18. In addition, the predetermined delay time TINT is longer than a time during which the power source voltage Vin returns to the predetermined voltage V1. Namely, the predetermined delay time TINT is longer than the switching delay time TSW. Therefore, the reset signal is supplied from the delay circuit 18 to the reset terminal RESET of the CPU 11 when the delay circuit 22 stops supply of the waiting signal to the interrupt terminal INT of the CPU 11. When the delay circuit 18 stops supply of the reset signal to the reset terminal RESET of the CPU 11, the operation voltage VSTD already becomes to a voltage which is higher than the predetermined voltage V1. As a result, the CPU 11 starts to operate in the initial state when the delay circuit 18 stops supply of the reset signal to the reset terminal RESET of the CPU 11.

What is claimed is:

1. A control device for controlling a central processing unit in accordance with an input voltage which is applied to said central processing unit and which is supplied by a power source having a power source voltage, said central processing unit having a first terminal for receiving a first signal to make said central processing unit assume a first state and a second terminal for receiving a second signal to make said central processing unit assume a second state, said control device comprising:

input voltage applying means connected to said power source for applying said input voltage to said central processing unit, said input voltage applying means being responsive to a first detection signal for stopping applying said input voltage to said central processing unit;

first detecting means for detecting whether said power source voltage is lower than a first voltage and produce said first detection signal when said power source voltage is lower than said first voltage;

first delay means for delaying said first detection signal during a first delay time and supply said first signal to said first terminal;

second detecting means for detecting whether said input voltage is lower than a second voltage which is lower than said first voltage, said second detecting means supplying said second signal to said second terminal when said input voltage is lower than said second voltage; and a charging means coupled to said power source and said processing unit for charging an electric charge, said charging means discharging said electric charge to apply a charged voltage to said central processing unit when said input voltage applying means stops applying said input voltage to said central processing unit.

2. A control device as claimed in claim 1, wherein said second detecting means comprises:

a second detecting circuit for detecting whether said input voltage is lower than said second voltage and produce a second detection signal when said input voltage is lower than said second voltage; and a second delay circuit for delaying said second detection signal during a second delay time to supply said second signal to said second terminal.

3. A control device as claimed in claim 2, wherein said first delay time is shorter than said second delay time.

4. A control device as claimed in claims 3, wherein said input voltage applying means resumes applying said input voltage to said central processing unit after a lapse of a third delay time commencing when said first detecting means ceases providing said first detection signal.

5. A control device as claimed in claim 4, wherein said first delay time is longer than said third delay time.

* * * * *